April 17, 1951 W. E. WITHALL 2,549,037
SHOCK ABSORBER FOR RAILWAY CAR TRUCKS
Filed April 30, 1949
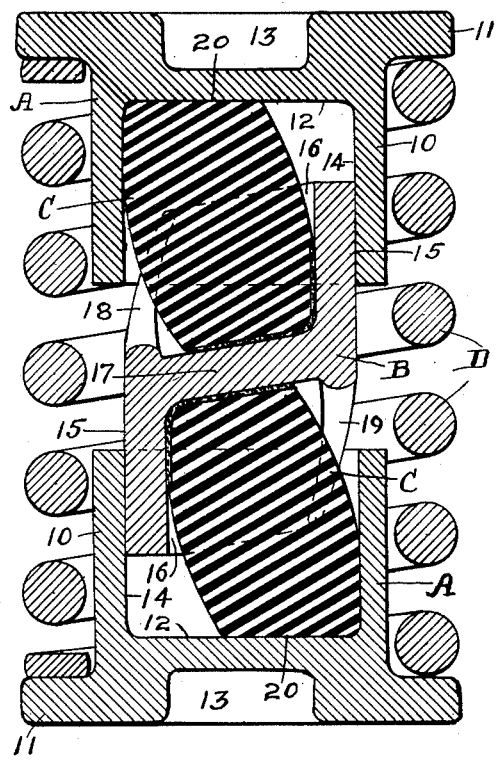
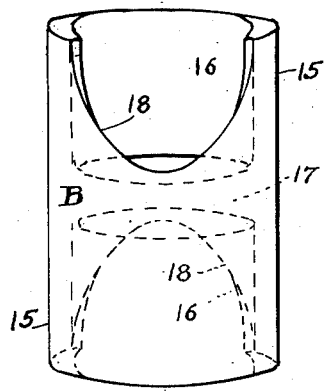
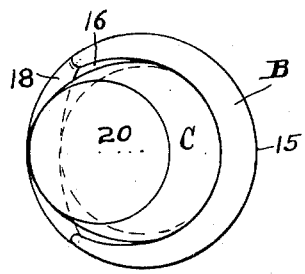
Inventor:
William E. Withall.
By Henry Fuchs
Atty.

Patented Apr. 17, 1951

2,549,037

UNITED STATES PATENT OFFICE 2,549,037

SHOCK ABSORBER FOR RAILWAY CAR TRUCKS

William E. Withall, Hinsdale, Ill., assignor to W. H. Miner, Inc., Chicago, Ill., a corporation of Delaware Application April 30, 1949, Serial No. 90,653

9 Claims. (Cl. 267—9)

This invention relates to improvements in shock absorbers adapted for use as snubbing devices in connection with truck springs of railway cars.

One object of the invention is to provide a friction shock absorber functioning as a snubbing device for truck springs of railway cars, comprising a pair of friction casings movable toward and away from each other lengthwise of the mechanism, a friction shoe having its opposite ends slidingly telescoped within the casings, spring means yieldingly opposing relative movement of the casings toward each other, wherein yielding means is provided for pressing the shoe into frictional contact with the casings, comprising rubber elements reacting between the shoe and each casing, pressing the opposite end portions of the shoe laterally outwardly in opposite directions into frictional engagement with the casings, respectively.

A more specific object of the invention is to provide a mechanism as set forth in the preceding paragraph, wherein the shoe presents pockets at opposite ends, accommodating the inner ends of the rubber elements, the rubber elements reacting between the casings and opposite ends of the shoe and being arranged diagonally in inclined relation to the central longitudinal axis of the mechanism to crowd the opposite ends of the shoe laterally outwardly in opposite directions into tight frictional contact with said casings, respectively, the rubber elements being placed under shear in compression of the mechanism, thus opposing relative approach of the casings in addition to forcing the shoe into frictional contact with said casings.

Other objects of the invention will more clearly appear from the description and claims hereinafter following.

In the accompanying drawing forming a part of this specification, Figure 1 is a transverse, vertical sectional view of my improved friction shock absorber. Figure 2 is a side elevational view of the friction shoe of the mechanism shown in Figure 1, looking from left to right in said figure. Figure 3 is a top plan view of the shoe and the associated top rubber block shown in Figure 1.

As illustrated in the drawing, my improved friction shock absorber comprises broadly top and bottom friction casings A—A, a friction shoe B, top and bottom rubber blocks C—C, and a spring D.

The top and bottom casings A—A are of the same design, each casing comprising a tubular section 10, having an annular follower flange 11 at its outer end. The outer end of the casing is closed by a transverse wall 12, which is provided with an outwardly opening, central seat 13, adapted to accommodate the spring centering projection of the corresponding spring follower plate, not shown, of the truck spring cluster. The tubular section of each casing is of circular cross section and presents a lengthwise extending, cylindrical, interior friction surface 14. The casings A—A are reversely arranged, end for end, with the follower flange 11 of the bottom casing at the lower end thereof and the follower flange 11 of the top casing at the upper end of the same.

The friction shoe B is in the form of a tubular member of cylindrical, exterior and interior cross section, having its top and bottom ends slidingly telescoped within the open ends of the top and bottom casings A—A. The opposite ends of the shoe, which are slidingly telescoped within the casings A—A, present cylindrical, exterior friction surfaces 15—15 engaging the surfaces 14—14 of the casings, respectively. The interior of the shoe B is divided into top and bottom chambers or pockets 16—16 by a transverse wall 17, which is inclined upwardly from left to right, as seen in Figure 1. As shown in said figure, the side wall of the shoe B at the top pocket 16 is cut out, or recessed, as indicated at 18, to accommodate the top rubber block C in inclined position, and the opposite side wall of the shoe B at the bottom pocket 16 is similarly cut out, or recessed, as indicated at 19, to accommodate the bottom rubber block C in inclined position.

The top and bottom rubber blocks C—C are disposed in the top and bottom pockets 16—16 of the shoe B and react between the shoe and the top and bottom casings, respectively, to force the shoe into frictional contact with said casings. Each block C is in the form of a cylinder tapered outwardly toward its top and bottom ends. Each block C presents flat, transverse faces 20—20 at the top and bottom ends thereof. Each block C is inclined away from the central longitudinal axis of the mechanism in upward direction, that is, it is disposed in inclined position diagonally of the corresponding casing A and the shoe B. The top block C has its bottom end face 20 supported on the inclined wall 17 of the shoe B, being vulcanized to the latter. The right hand side face of this block, as seen in Figure 1, bears on the inner side of the side wall of the shoe at the right hand side of the latter and is also preferably vulcanized to the same. The upper end portion of the top block C bears on the top end wall 12 and the left hand side wall portion of the top casing A, and the top end face 20 of said block is in flat engagement with said top wall 12. As shown in Figure 1, the bottom block C has its bottom end portion bearing on the bottom wall 12 and the right hand side wall portion of the bottom casing A, the flat bottom end face 20 bearing flatly on the wall 12. The upper end portion of the bottom block C bears on the bottom side of the inclined wall 17 and the left hand side wall portion of the shoe B, the flat top end face 20 of said block and the side face thereof being preferably vulcanized to the wall 17 and said side wall portion of the shoe.

The spring D is in the form of a helical coil surrounding the casings A—A and bearing at its top and bottom ends on the follower flanges 11—11 of the top and bottom casings.

My improved shock absorber preferably replaces one of the coil spring units of a truck spring cluster of a railway car, and is interposed between the usual top and bottom spring plates thereof, with the spring centering projections engaged in the seats 13—13 of the top and bottom casings A—A.

The operation of my improved shock absorber is as follows: Upon the cluster of springs of the truck of the railway car being compressed between the spring follower plates of the truck springs, the top casing A is forced downwardly toward the bottom casing A, against the resistance of the spring D and the resistance of the rubber blocks C—C. During this action, the shoe B is pressed against the interior friction surfaces of the casings A—A by the inclined, diagonally disposed rubber blocks C—C, these blocks being in shear while being compressed between the end walls of the casings and the inclined dividing wall 17 of the shoe, and pressing the bottom end of the top block C to the right and the upper end of the bottom block C to the left, as viewed in Figure 1, to force the upper end of the shoe B against the interior wall of the top casing at the right hand side of the mechanism, and the lower end of said shoe against the interior wall of the bottom casing at the left hand side of mechanism. High frictional resistance is thus produced between the casings A—A and the shoe B during downward movement of the top casing toward the bottom casing A, the top casing A sliding downwardly on the shoe B and the latter sliding downwardly in the bottom casing A. Frictional resistance is thus provided to effectively snub the action of the truck springs.

During recoil of the truck springs, the spring D and the rubber blocks C—C return the parts to the normal full release positions shown in Figure 1. Inasmuch as the rubber blocks C—C press the friction shoe B against the interior walls of the casings A—A during movement of the casings away from each other, the truck springs are also effectively snubbed during recoil of the same.

I claim:

1. In a friction shock absorber, the combination with a pair of friction casings movable lengthwise toward and away from each other; of a friction shoe having opposite ends thereof slidingly telescoped in said casings; yielding means bearing at opposite ends on said casings to oppose relative lengthwise movement of said casings toward each other; and yielding means reacting between each casing and said shoe, yieldingly pressing said shoe against the interior wall of one of said casings at one side of the mechanism and against the interior wall of the other casing at the opposite side of the mechanism.

2. In a friction shock absorber, the combination with a pair of friction casings movable lengthwise toward and away from each other; of a friction shoe having opposite ends thereof slidingly telescoped in said casings; yielding means having its opposite ends bearing on said casings to oppose relative lengthwise movement of said casings toward each other; and rubber cushioning means reacting between each casing and said shoe, yieldingly pressing said shoe against the interior wall of one of said casings at one side of the mechanism and against the interior wall of the other casing at the opposite side of the mechanism.

3. In a friction shock absorber, the combination with a pair of friction casings movable lengthwise toward and away from each other; of a friction shoe having opposite ends thereof slidingly telescoped in said casings; yielding means bearing at opposite ends on said casings to oppose relative lengthwise movement of said casings toward each other; and a rubber cushioning block having its longitudinal axis inclined to the longitudinal axis of the mechanism, reacting between each casing and said shoe, yieldingly pressing said shoe against the interior wall of one of said casings at one side of the mechanism and against the interior wall of the other casing at the opposite side of the mechanism.

4. In a friction shock absorber, the combination with a pair of friction casings movable lengthwise toward and away from each other; of a friction shoe having opposite ends thereof slidingly telescoped in said casings; yielding means bearing at opposite ends on said casings to oppose relative lengthwise movement of said casings toward each other; and additional yielding means reacting between each casing and said shoe, yieldingly opposing lengthwise movement of said casings toward said shoe and pressing said shoe against the interior wall of one of said casings at one side of the mechanism and against the interior wall of the other casing at the opposite side of the mechanism.

5. In a friction shock absorber, the combination with a pair of friction casings movable lengthwise toward and away from each other; of a friction shoe having opposite ends thereof slidingly telescoped in said casings; yielding means reacting between said casings to oppose relative lengthwise movement of said casings toward each other; a rubber cushioning block reacting between each casing and said shoe, yieldingly opposing lengthwise movement of said casings toward said shoe, and pressing said shoe against the interior wall of one of said casings at one side of the mechanism, and against the interior wall of the other casing at the opposite side of the mechanism.

6. In a friction shock absorber, the combination with a pair of friction casings movable lengthwise toward and away from each other, said casings being closed at their outer ends by transverse walls; of a friction shoe having its opposite ends slidingly telescoped within the casings; yielding means reacting between said casings to oppose relative lengthwise movement of said casings toward each other; and an inclined, diagonally disposed yielding element reacting between each casing and said shoe, said diagonally disposed elements being inclined in the same direction.

7. In a friction shock absorber, the combination with a pair of friction casings movable lengthwise toward and away from each other, said casings being closed at their outer ends by transverse walls; of a friction shoe having its opposite ends slidingly telescoped within the casings; yielding means reacting between said casings to oppose relative lengthwise movement of said casings toward each other; and a rubber block reacting between said shoe and each casing, said block having its longitudinal axis inclined diagonally with respect to the corresponding casing and said shoe, said blocks being inclined in the same direction.

8. In a friction shock absorber, the combination with a pair of friction casings movable lengthwise toward and away from each other; of a friction shoe having opposite ends thereof slidingly telescoped within said casings, said shoe being hollow and having a transverse wall dividing the same lengthwise into two chambers; a spring surrounding said casings and yieldingly opposing movement thereof toward each other; and an inclined, diagonally disposed yielding element in each casing and extending into the chamber at the corresponding end of said shoe, said element having its opposite ends bearing, respectively, on the end wall of said casing and the transverse wall of said shoe.

9. In a friction shock absorber, the combination with a pair of friction casings movable lengthwise toward and away from each other; of a friction shoe having opposite ends thereof slidingly telescoped within said casings, said shoe being hollow and having a transverse wall dividing the same lengthwise into two chambers; a spring surrounding said casings and yieldingly opposing movement thereof toward each other; and an inclined, diagonally disposed, yielding rubber block in each casing extending into the chamber at the corresponding end of said shoe, said block having one end thereof bearing on the end wall of said casing, and the side portion of said block at said end bearing on the side wall of said casing at one side of the mechanism, said block having the other end thereof bearing on the transverse wall of said shoe and the side wall of said shoe at the opposite side of the mechanism.

WILLIAM E. WITHALL.

REFERENCES CITED

The following references are of record in the file of this patent:

UNITED STATES PATENTS

| Number | Name | Date |
|---|---|---|
| 1,255,214 | O'Connor | Feb. 1918 |
| 2,306,398 | Light | Dec. 29, 1942 |